United States Patent
Weiss et al.

(10) Patent No.: US 11,946,738 B2
(45) Date of Patent: Apr. 2, 2024

(54) DETERMINATION OF THE AVERAGE DISTANCE BETWEEN A MEASUREMENT DEVICE AND A CONDUCTOR

(71) Applicant: Siemens Energy Global GmbH & Co. KG, Bayern (DE)

(72) Inventors: Roland Weiss, Erlangen (DE); Mike Liepe, Hemhofen (DE); Stefan Wakolbinger, Graz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 195 days.

(21) Appl. No.: 17/622,466

(22) PCT Filed: Jun. 16, 2020

(86) PCT No.: PCT/EP2020/066622
§ 371 (c)(1),
(2) Date: Dec. 23, 2021

(87) PCT Pub. No.: WO2021/001145
PCT Pub. Date: Jan. 7, 2021

(65) Prior Publication Data
US 2022/0244031 A1   Aug. 4, 2022

(30) Foreign Application Priority Data
Jul. 1, 2019 (EP) .................................. 19183605

(51) Int. Cl.
*G01B 7/00* (2006.01)
*B64C 39/02* (2023.01)
(Continued)

(52) U.S. Cl.
CPC ............ *G01B 7/023* (2013.01); *B64C 39/024* (2013.01); *F17D 5/005* (2013.01); *G01B 7/26* (2013.01);
(Continued)

(58) Field of Classification Search
CPC .................................. G01B 7/00; G01B 7/023
(Continued)

(56) References Cited

U.S. PATENT DOCUMENTS

| 6,107,801 A | 8/2000 | Hopwood et al. |
| 2018/0172866 A1 | 6/2018 | Vohra et al. |

FOREIGN PATENT DOCUMENTS

| DE | 19846428 A1 | 5/1999 |
| EP | 3228980 A1 | 10/2017 |

(Continued)

OTHER PUBLICATIONS

Salem Ahmed et al: "Tilt-Depth Method: a Simple Depth Estimation Method Using First-Order Magnetic Derivatives", the Leading Edge, Society of Exploration Geophysicists, US, vol. 26, No. 12, pp. 1502-1505, XP001508574, ISSN: 1070-485X, DOI: 10.1190/1.2821934; 2007.

(Continued)

*Primary Examiner* — Vincent Q Nguyen
(74) *Attorney, Agent, or Firm* — Wolter Van Dyke Davis, PLLC

(57) ABSTRACT

A method for determining the average distance between a measurement device and a conductor includes determining a profile of a horizontal component using the horizontal position of the device that indicates the orthogonal distance between the device and the longitudinal axis of the conductor parallel to the earth's surface, measured at at least two different horizontal positions, determining a profile of the vertical component, which is associated with the determined profile of the horizontal component, using the horizontal position of the device, wherein the vertical profile is determined by measuring the vertical components associated with the horizontal components, determining the ratio of the profiles as a function using the horizontal position of the (Continued)

device, determining the derivative of the ratio according to the horizontal position, determining the reciprocal of the derivative, and determining the average distance between the devices and the conductor from the reciprocal of the derivative.

17 Claims, 9 Drawing Sheets

(51) Int. Cl.
*F17D 5/00* (2006.01)
*G01B 7/02* (2006.01)
*G01B 7/26* (2006.01)
*G01D 5/20* (2006.01)
*B64U 10/13* (2023.01)
*B64U 101/00* (2023.01)

(52) U.S. Cl.
CPC .............. *G01D 5/20* (2013.01); *B64U 10/13* (2023.01); *B64U 2101/00* (2023.01)

(58) Field of Classification Search
USPC .................... 324/200, 207.16, 219, 331, 345
See application file for complete search history.

(56) References Cited

FOREIGN PATENT DOCUMENTS

| | | |
|---|---|---|
| RU | 2504762 C1 | 1/2014 |
| RU | 2510500 C1 | 1/2014 |
| RU | 2630856 C1 | 9/2017 |
| WO | 2014163536 A1 | 10/2014 |

OTHER PUBLICATIONS

PCT International Search Report and Written Opinion of International Searching Authority dated Jul. 17, 2020 corresponding to PCT International Application No. PCT/EP2020/066622 filed Jun. 16, 2020.

DETERMINATION OF THE AVERAGE DISTANCE BETWEEN A MEASUREMENT DEVICE AND A CONDUCTOR

CROSS REFERENCE TO RELATED APPLICATIONS

This application is the US National Stage of International Application No. PCT/EP2020/066622 filed 16 Jun. 2020, and claims the benefit thereof. The International Application claims the benefit of European Application No. EP19183605 filed 1 Jul. 2019. All of the applications are incorporated by reference herein in their entirety.

FIELD OF THE INVENTION

The present invention relates to a method for determining the distance of a measuring device from a conductor. The invention furthermore provides a measuring device. The invention may, in particular, be used to determine the depth of the location of a pipeline below the Earth's surface.

BACKGROUND OF INVENTION

Pipelines for transporting oil and gas are critical supply infrastructures and need to be monitored over thousands of kilometers. The majority of these pipelines runs underground, typically at a burying depth of 1.5-3 meters. One important inspection criterion is the regular determination of the so-called depth of cover above the pipeline. This is defined as the distance of the upper edge of the pipeline from the Earth's surface and must not fall below a certain threshold value, in order to ensure the protection of the pipeline from the effects of weather (for example underwashing) or from human activities (for example agriculture). The depth of cover above the pipeline may vary, especially because of soil movements on the surface (for example ploughing, irrigation), or else even in unstable substrata such as marshes or desert sand.

Once the pipeline is no longer visible after burying and backfilling, the precise location of the upper edge of the pipeline is an important prerequisite for measuring the depth of cover, since only the terrain profile above the pipeline can regularly be measured over a wide area (for example by LiDAR flyovers). Taking the difference between the terrain surface and the upper edge of the pipeline then determines the depth of cover. It seems technically obvious to survey the pipeline with high accuracy using a GNSS/RTK system during the laying. In particular relatively old pipeline installations, however, were not recorded or were not recorded with sufficient accuracy during the laying. Sometimes only two-dimensional data (longitude and latitude), but not the height value, are also available.

Methods for locating the pipeline, or its metal structure, in the soil are known in the prior art. Most of these methods measure the magnetic field generated by feeding in a current and are used near the Earth's surface (portable measuring instruments or vehicular systems), which favors the transmission of the injected measurement signal and therefore the sensitivity of the measurement. Measurement of the depth of cover over thousands of kilometers, however, is not practicable because of the manual outlay.

One alternative is ground penetrating radar. A measurement signal does not need to be fed in for this, and furthermore the object need not be metallic. The crucial disadvantages of this technology are on the one hand the dependency of the usability on the ground condition (for example difficulties when there is moisture in the ground) and on the other hand the strong reflection of the signal on the Earth's surface as soon as the system is used some distance away from the ground. The latter, however, is necessary for practicable use since sizeable distances can be managed in an acceptable time only with an aerial vehicle.

Another established method for the internal inspection of pipelines is the use of (smart/intelligent) pigging. The pig is introduced into the course of the pipeline and advances through the pipeline because of the flow rate of the transported medium. The determination of the position is carried out by inertial measuring systems (IMU/odometry). Inherent in such systems is the property of a drift of the measurement, i.e. error propagation due to the incremental advance determination. This error behavior cannot trivially be compensated for by external and therefore absolute measurements owing to the lack of contact with the outside world. This is contributed to by the aspect of the usually metallic structure of the pipeline, which interferes (Faraday Cage) with the transmission of radio signals (electric fields). Positioning devices (acoustic, magnetic, radio-technology, etc.), which are fitted on the outer skin of the pipeline and detect the passage of the geopig and can also limit the drift behavior, are known from the prior art.

This form of sensor technology is however normally not present, particularly in poorly calibrated old installations. Besides the drift behavior, a further disadvantage is also the fact that certain types of pipelines are fundamentally not piggable.

Approaches/methods which determine the location of underground pipelines by flying over with UAVs or helicopters are also occasionally known from the prior art. This allows more efficient measurement over long distances than when using manual measuring instruments or vehicular systems. Some methods only use the emitted thermal radiation, and therefore operate purely passively. In VLF (Very Low Frequency) positioning, the worldwide network of VLF communication stations, which transmit in the frequency range of from 15 kHz to 30 kHz, is used. If the EM wave of a VLF transmitter impinges on an electrical conductivity contrast in the substratum, the real and imaginary parts of the normalized Hz component change. Since a metal object which lies parallel to the wavefront of the EM wave in the soil represents a very high conductivity contrast, a relatively large measurement effect can be achieved. In order to improve the accuracy, the signals of a plurality of transmitters are often used as a basis for the positioning by means of the passive VLF method. A further increase in the accuracy may be achieved by the active VLF method. In the active VLF method, mobile VLF transmitters are set up in order to generate defined and relatively high signal levels for the evaluation according to the VLF method. In some systems, the active and passive VLF methods may be combined. In which case, in tests, all methods based on the VLF method have been found to be insufficiently accurate or insufficiently practicable. Methods are also known, which use the CCP (cathodic corrosion protection) system to inject currents in the range of between 1 kHz and 10 kHz into the pipeline, in order subsequently to measure the horizontal component of the magnetic field of the injected current using a coil. The depth estimation on the basis of the full width at half maximum of the measurement curve is not, however, sufficiently accurate to satisfy the requirements of the pipeline operators in developed economies.

SUMMARY OF THE INVENTION

An object of the invention is to provide an alternative solution for measuring the location of a pipeline below the Earth's surface.

The invention is defined by the features of the independent claims. The dependent claims relate to advantageous refinements and configurations. Further features, application possibilities and advantages of the invention emerge from the following description.

One aspect of the invention consists in using the ratio of the vertical component and the horizontal component of a magnetic flux density generated by an electrical current of a conductor in order to determine the distance of the conductor from a measuring apparatus.

The invention claims a method for determining the average distance of a measuring device from a conductor, wherein the measuring device comprises a measuring system, wherein an electrical current flows through the conductor so that a magnetic field having a magnetic flux density is formed, the magnetic flux density having a horizontal component and a vertical component, having the steps: —determining a profile of the horizontal component against the horizontal position of the measuring device, wherein the horizontal position indicates the orthogonal distance of the measuring device from the longitudinal axis of the conductor parallel to the Earth's surface, wherein the profile of the horizontal component is determined by measuring the horizontal components at at least two different horizontal positions (for example by moving the measuring device to and fro) using the measuring system of the measuring device, which changes the horizontal position, and—determining a profile, associated with the profile that has been determined of the horizontal component, of the vertical component against the horizontal position of the measuring device, wherein the profile of the vertical component is determined by measuring the vertical components, associated with the horizontal components that have been determined, using the measuring system, —determining the ratio of the profile of the vertical component to the profile of the horizontal component as a function of the horizontal position of the measuring device, —determining the derivative of the ratio with respect to the horizontal position, —determining the inverse of the derivative, and—determining the average distance of the measuring devices from the conductor from the inverse of the derivative.

The vertical position and depth of the conductor below the Earth's surface may then be determined from the average distance of the measuring device from the conductor.

Using the ratio of the profile of the vertical component to the profile of the horizontal component as a function of the horizontal position of the measuring device has the advantage that the measurement result becomes independent of the strength of the exciting current. This is advantageous since the current strength may vary over the measurement length/ current strength losses may occur.

The invention furthermore claims a method for determining the average distance of at least two mutually separated measuring devices (the measuring apparatuses may in this case be static) from a conductor, wherein each measuring device comprises a measuring system, wherein an electrical current flows through the conductor so that a magnetic field having a magnetic flux density is formed, the magnetic flux density having a horizontal component and a vertical component, having the steps: —determining a profile of the horizontal component against the horizontal position of the measuring devices, wherein the horizontal position indicates the orthogonal distance of the measuring device from the longitudinal axis of the conductor parallel to the Earth's surface, wherein the profile of the horizontal component is determined by measuring the horizontal components using the measuring systems of the measuring devices, —determining the profile, associated with the profile that has been determined of the horizontal component, of the vertical component against the horizontal position of the measuring devices, wherein the profile of the vertical component is determined by measuring the vertical components, associated with the horizontal components that have been determined, using the corresponding measuring systems, —determining the ratio of the profile of the vertical component to the profile of the horizontal component as a function of the horizontal position of the measuring devices, —determining the derivative of the ratio with respect to the horizontal position, —determining the inverse of the derivative, and—determining the average distance of the measuring devices from the conductor from the inverse of the derivative.

The invention furthermore claims a method for determining the average distance of a measuring device from a conductor, wherein the measuring device comprises at least two measuring systems, the measuring systems being arranged at different vertical positions, wherein an electrical current flows through the conductor so that a magnetic field having a magnetic flux density is formed, the magnetic flux density having a horizontal component and a vertical component, having the steps: —determining profiles of the horizontal component against the horizontal position of the measuring systems, wherein the horizontal position indicates the orthogonal distance of the measuring device from the longitudinal axis of the conductor parallel to the Earth's surface, wherein the profiles of the horizontal component are determined by measuring the horizontal components at at least two different horizontal positions (for example by moving the measuring device to and fro) using the measuring systems of the measuring device, which changes the horizontal position, and—determining the profiles, associated with the profiles that have been determined of the horizontal component, of the vertical components against the horizontal position of the measuring device, wherein the profiles of the vertical components are determined by measuring the vertical components, associated with the horizontal components that have been determined, using the corresponding measuring systems, —determining the ratios of the profiles of the vertical component to the profiles of the horizontal component as a function of the horizontal position of the measuring device, —determining the derivatives of the ratios with respect to the horizontal position, —determining the inverses of the derivatives, and—determining the average distance of the measuring devices from the conductor from the inverses of the derivatives.

The invention furthermore claims a method for determining the average distance of at least two mutually separated measuring devices (the measuring apparatuses may be static) from a conductor, wherein each measuring device comprises an equal number of at least two measuring systems, the measuring systems of the same measuring device being arranged at different vertical positions, wherein an electrical current flows through the conductor so that a magnetic field having a magnetic flux density is formed, the magnetic flux density having a horizontal component and a vertical component, having the steps: —determining profiles of the horizontal component against the horizontal positions using measuring systems that correspond in respect of the vertical position, wherein the horizontal position indicates the orthogonal distance of the measuring device from the longitudinal axis of the conductor parallel to the Earth's surface, wherein the profiles of the horizontal component are determined by measuring the horizontal components using the measuring systems of the measuring devices, and— determining the profiles, associated with the profiles that have been determined of the horizontal component, of the vertical components against the horizontal position of the measuring devices, wherein the profiles of the vertical components are determined by measuring the vertical components, associated with the horizontal components that have been determined, using the corresponding measuring systems, —determining the ratios of the profiles of the vertical component to the profiles of the horizontal component as a function of the horizontal position of the measuring device, —determining the derivatives of the ratios with respect to the horizontal positions, —determining the inverses of the derivatives, and—determining the average distance of the measuring devices from the conductor from the inverses of the derivatives.

In this case, the measuring systems of different measuring devices are arranged at the same vertical positions/height relative to the Earth's surface or the measuring devices have measuring systems that correspond to one another.

In a further configuration, best-fit lines to take into account the different vertical positions of the measuring systems may be compiled and included for determining the average distance of the measuring devices from the conductor from the inverses of the derivatives. This has the advantage that the influence of external perturbations on the position determination of the pipeline can be minimized.

In a further configuration, each measuring system may comprise three coils, the coils being mutually orthogonal. For the vertical component (z direction), a coil in the vertical direction may be used. For the horizontal component, it is generally necessary to use two coils, one in the x direction and one in the y direction. In the case of DC current, alternatives to coils, for example MR sensors, are used for the measurement.

In a further configuration, the induction voltage generated in the coils by the magnetic field may be filtered.

In a further configuration, a bandpass filter may be used for the filtering, the bandpass filter being adapted according to the frequency of the current of the current-carrying conductor.

In a further configuration, the conductor may be part of a pipeline for transporting oil and/or gas.

In a further configuration, the conductor may be part of a cathodic corrosion protection system of a pipeline.

In a further configuration, the electrical current which flows through the conductor may have a frequency range of from 30 Hz to 2 kHz.

In a further configuration, the electrical current which flows through the conductor may have a sinusoidal characteristic.

In a further configuration, the measuring device may be transported by a manned or unmanned flying object/aircraft.

The invention furthermore claims a measuring device for determining the average distance between the measuring device and a conductor through which a current flows, the measuring device being arranged in or on an aircraft, comprising: —at least two measuring systems arranged vertically with respect to one another, each measuring system comprising three coils, the coils being mutually orthogonal.

In a further configuration, the measuring apparatus may be configured and programmed to carry out a method according to the invention.

The invention provides the following advantages:

The determination of the average distance of the measuring device from the conductor (and therefrom the position and depth of the conductor below the Earth's surface) is independent of the amplitude of the current fed in, since relative rather than absolute measurement is carried out. The measurement is therefore independent of leakage currents of the conductor/pipeline to the ground.

The determination of the average distance of the measuring device from the conductor (and therefrom the position and depth of the conductor below the Earth's surface) is primarily independent of the frequency of the current fed in, since an absolute measurement of the magnetic field is not necessary. With the restriction that a filter possibly used at the input must be tuned to the frequency. With the same setting of the filter and of an amplifier for a measuring system (for example a coil system), a deviation of the frequency does not lead to an error.

A drift of the nominal gain against the temperature does not lead to an error in the determination of the average distance of the measuring device from the conductor (and therefrom the position and depth of the conductor below the Earth's surface) so long as all measurement channels of a measuring system (for example of a coil system) drift uniformly.

The influence of perturbations due to further sources in the same frequency band on the determination of the depth of the conductor below the Earth's surface is relatively small.

BRIEF DESCRIPTION OF THE DRAWINGS

The particularities and advantages of the invention will become apparent from the following explanations of a plurality of exemplary embodiments with the aid of schematic drawings, in which.

DETAILED DESCRIPTION OF THE INVENTION

Figure 1:
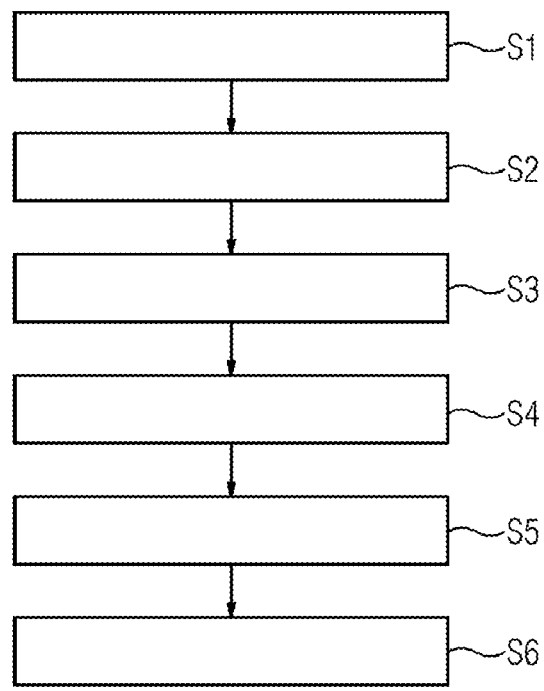
FIG. 1 shows a flowchart of the method according to the invention.

FIG. 1 shows a flowchart of the steps S1-S6 of the method according to the invention for determining the average distance of a measuring device from a conductor, wherein the measuring device comprises a measuring system, wherein an electrical current flows through the conductor, so that a magnetic field having a magnetic flux density is formed, the magnetic flux density having a horizontal component and a vertical component.

The steps of the method are in detail: —method step S1: determining a profile of the horizontal component against the horizontal position of the measuring device, the horizontal position indicating the orthogonal distance of the measuring device from the longitudinal axis of the conductor parallel to the Earth's surface, the profile of the horizontal component being determined by measuring the horizontal components at at least two different horizontal positions using the measuring system of the measuring device, which changes the horizontal position, and—method step S2: determining a profile, associated with the profile that has been determined of the horizontal component, of the vertical component against the horizontal position of the measuring device, the profile of the vertical component being determined by measuring the vertical components, associated with the horizontal components that have been determined, using the measuring system, —method step S3: determining the ratio of the profile of the vertical component to the profile of the horizontal component as a function of the horizontal position of the measuring device, —method step S4: determining the derivative of the ratio with respect to the horizontal position, —method step S5: determining the inverse of the derivative, and—method step S6: determining the average distance of the measuring devices from the conductor from the inverse of the derivative.

Extensions of the method with a plurality of measuring devices (in this case, the measuring devices may be immobile) and extensions with a plurality of measuring systems on the measuring device(s) are possible. A plurality of measuring systems have the advantage that measurement perturbations may be compensated for.

One aspect of the invention consists in providing a method for determining the distance between a measuring device and a conductor through which an electrical current flows (for example as part of a pipeline). In order to record the distance of a pipeline through which an AC current flows or a conductor, a measurement of the horizontal and vertical components of the magnetic field strength, or the magnetic flux density, is required.

For the vertical component (v* coordinate axis), a coil in the vertical direction may be used. For the horizontal component, it is generally necessary to use two coils, one in the h* coordinate axis and one in the z* coordinate axis.

Figure 2:
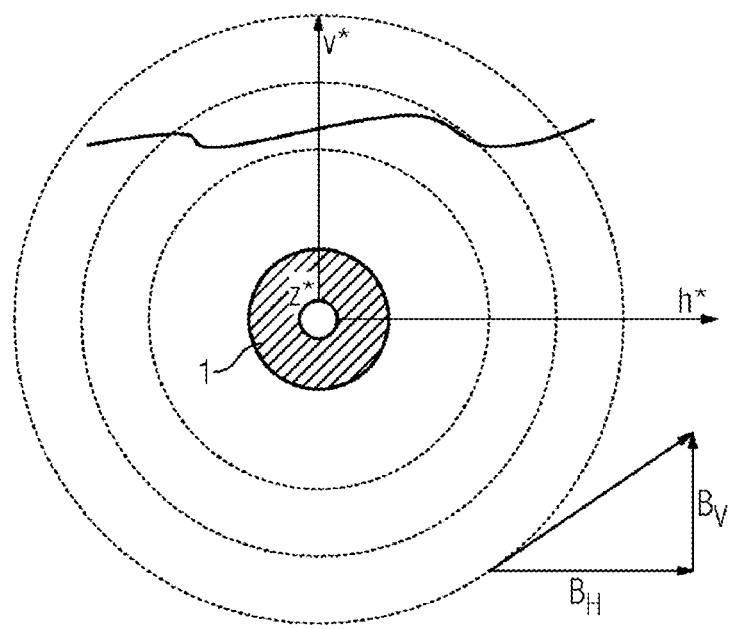
FIG. 2 shows a schematic representation of the conductor, the magnetic field and the coordinate system.

FIG. 2 shows a schematic representation of the conductor 1, the magnetic field (horizontal component $B_H$ of the magnetic flux density and vertical component $B_V$ of the magnetic flux density) and the coordinate system (h*, v* and z* coordinate axis).

$$\vec{B}_H = \vec{B}_X + \vec{B}_Y \quad B_H = \sqrt{\vec{B}_X^2 + \vec{B}_Y^2} \quad (1)$$

If there are no ferromagnetic materials in the environment of the conductor/pipeline—the pipeline itself may be uniformly ferromagnetic, but does not have to be—then the magnetic field generated by the current in the pipeline in the environment of a long, relatively straight pipeline may be calculated as follows:

$$B_H = \frac{\mu_0 \cdot I}{2\pi} \cdot \frac{-v}{(v^2 + h^2)} \quad B_v = \frac{\mu_0 \cdot I}{2\pi} \cdot \frac{h}{(v^2 + h^2)} \quad (2)$$

Figure 3:
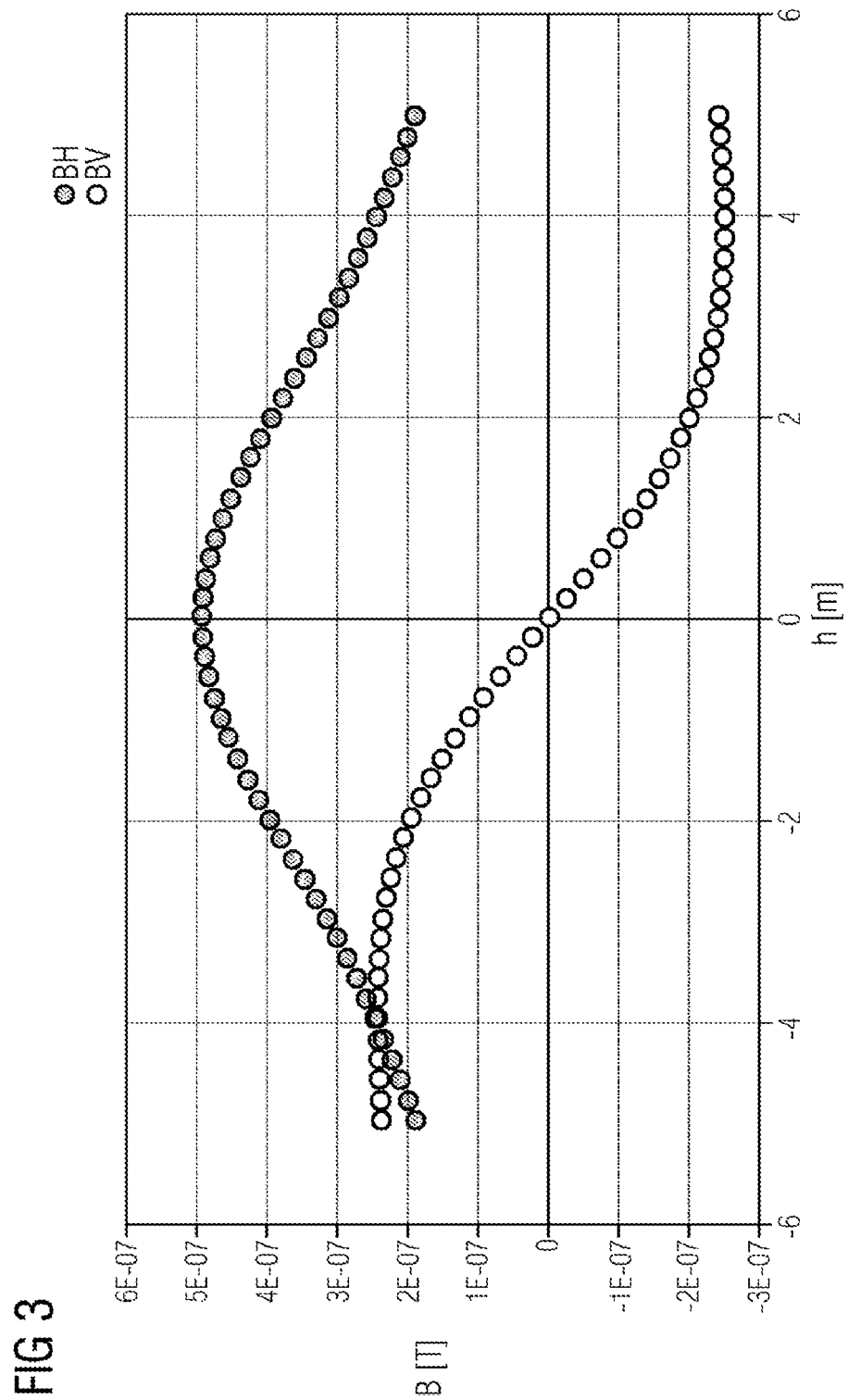
FIG. 3 shows a profile of the horizontal and vertical components of the magnetic flux density against the horizontal position of the measuring apparatus.

Here, h is the horizontal position on the h coordinate axis and v is the vertical position on the v coordinate axis of the measuring system (coil system) relative to the pipeline and I is the current strength. The profile of the horizontal component $B_H$ and of the vertical component $B_V$ of the magnetic flux density B in tesla T against the horizontal position h in meters m of the measuring system of the measuring apparatus is represented in FIG. 3.

Figure 4:
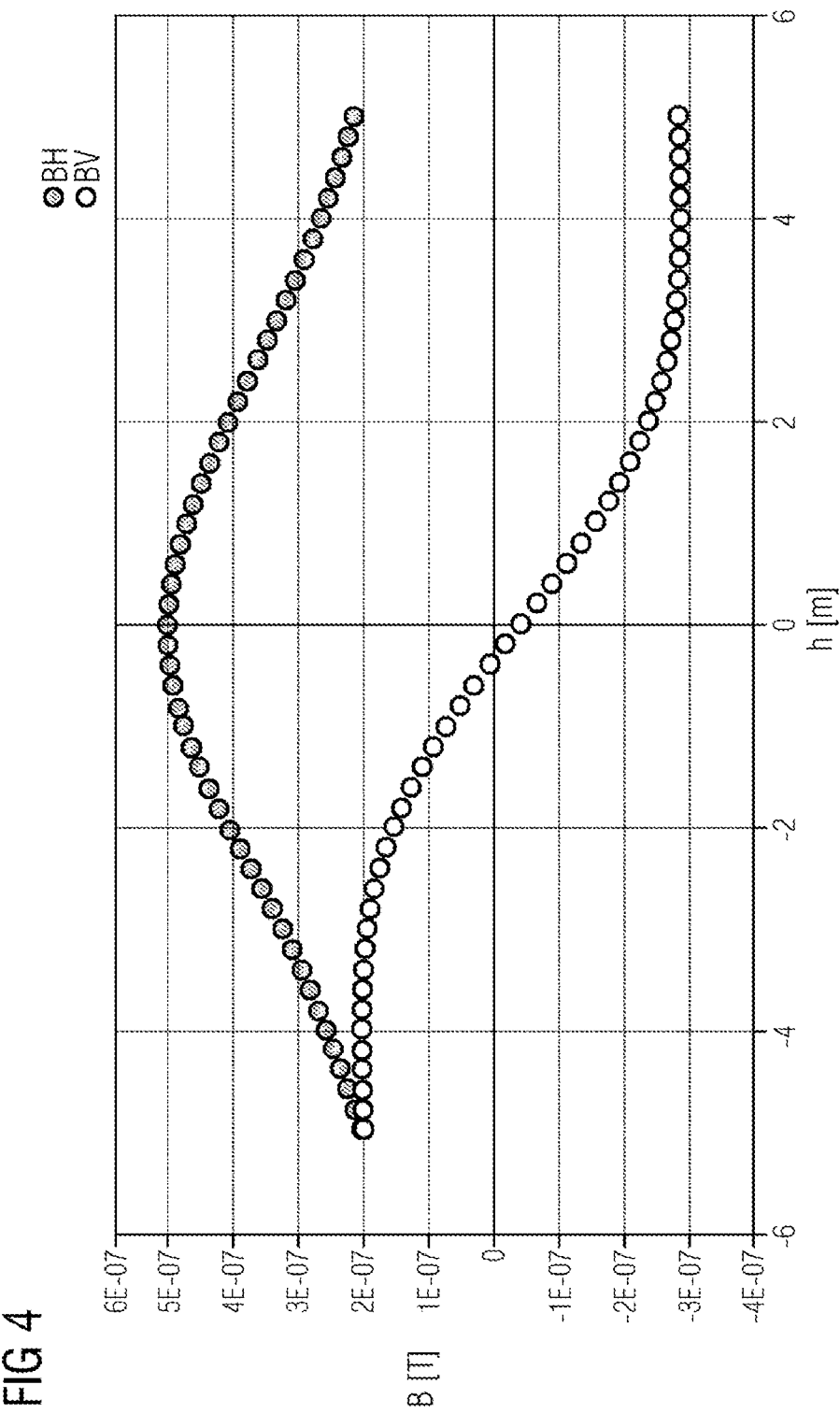
FIG. 4 shows a profile of the horizontal and vertical components of the magnetic flux density against the horizontal position of the measuring apparatus with the assumption of a perturbation due to a parallel second conductor at a large distance.

FIG. 4 represents the profile of the horizontal component $B_H$ and of the vertical component $B_V$ of the magnetic flux density against the horizontal position of the measuring system of the measuring apparatus with the assumption of a perturbation due to a parallel second conductor at a large distance.

Figure 5:
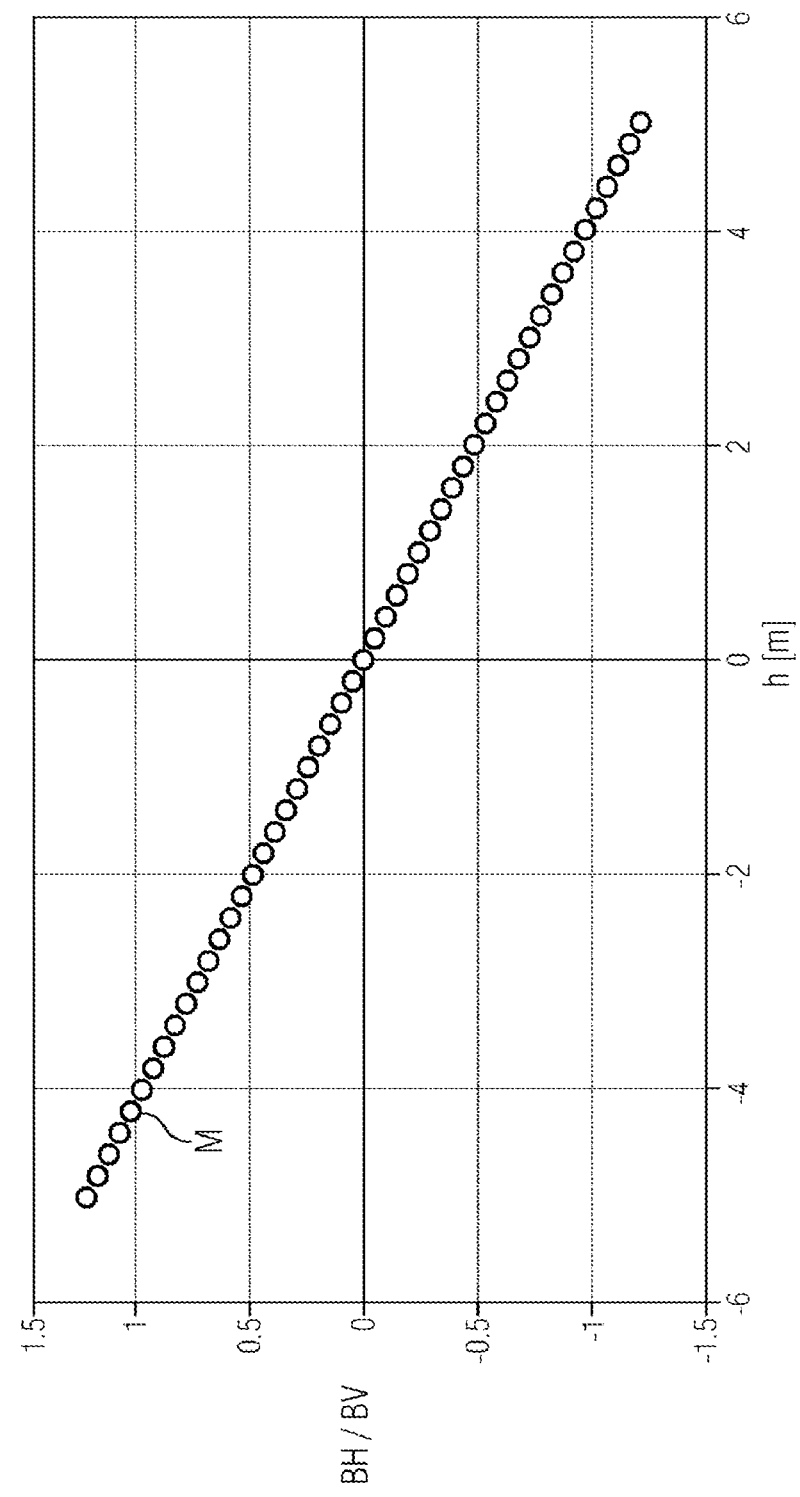
FIG. 5 shows a profile of the ratio of vertical component to horizontal component of the magnetic flux density against the horizontal position of the measuring apparatus.

By forming the ratio M (represented in FIG. 5) of the vertical component $B_V$ to the horizontal component $B_H$, the measurement result becomes independent of the strength of the exciting current I, so that changes in the current I over the length of the pipeline, for example because of leakage currents, etc., or over time due to a drift of the feeding current source no longer have an effect.

$$M = \frac{B_V}{B_H} = \frac{-h}{v} \quad (3)$$

If the measurement of the horizontal component $B_H$ and the vertical component $B_V$ (for example by an unmanned aerial vehicle (UAV)) is now carried out at different horizontal positions h (for example by a movement horizontally over the conductor/pipeline), the vertical position v of the measuring apparatus/measuring system above the pipeline (and therefore the depth of the pipeline) may be calculated relatively accurately by differentiating the ratio M with respect to the vertical position v (gradients of M). The depth of the midpoint of the pipeline is the inverse of the derivative.

The zero point of the differentiated inverted ratio M reflects the vertical position v of the pipeline.

$$\left(\frac{\partial M}{\partial h}\right)^{-1}_{M=0; h=0} = v_{Pipeline} \quad (4)$$

Figure 6:
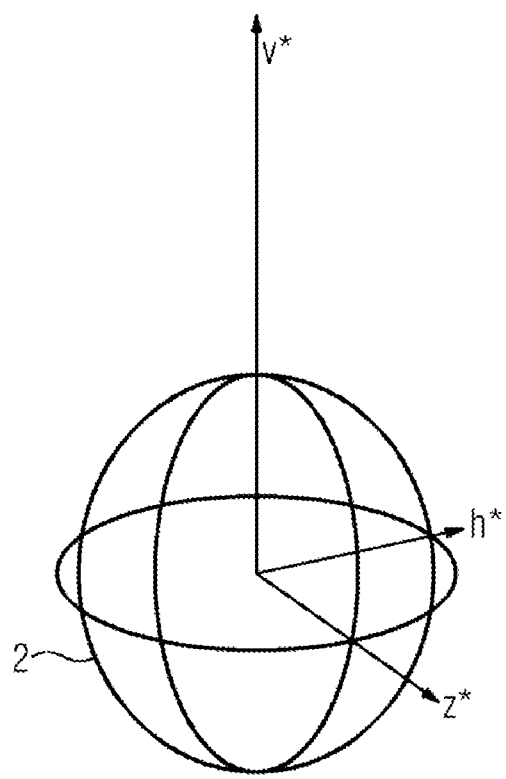
FIG. 6 shows a coil system for measuring the horizontal component and the vertical component of the magnetic flux density.

FIG. 6 represents by way of example a triaxial measuring system 2 in the form of a coil system consisting of three coils for measuring the horizontal component $B_H$ of the magnetic flux density, which is calculated from the h* and z* coordinates, and the vertical component $B_V$, which with a favorable orientation of the measuring system 2 corresponds to the v* coordinate.

The induction voltage generated in the coils by the time-varying magnetic field may be narrow-band filtered with a bandpass filter, which is adjusted to the frequency of the current fed in by means of the CCP system, amplified and digitized.

Figure 7:
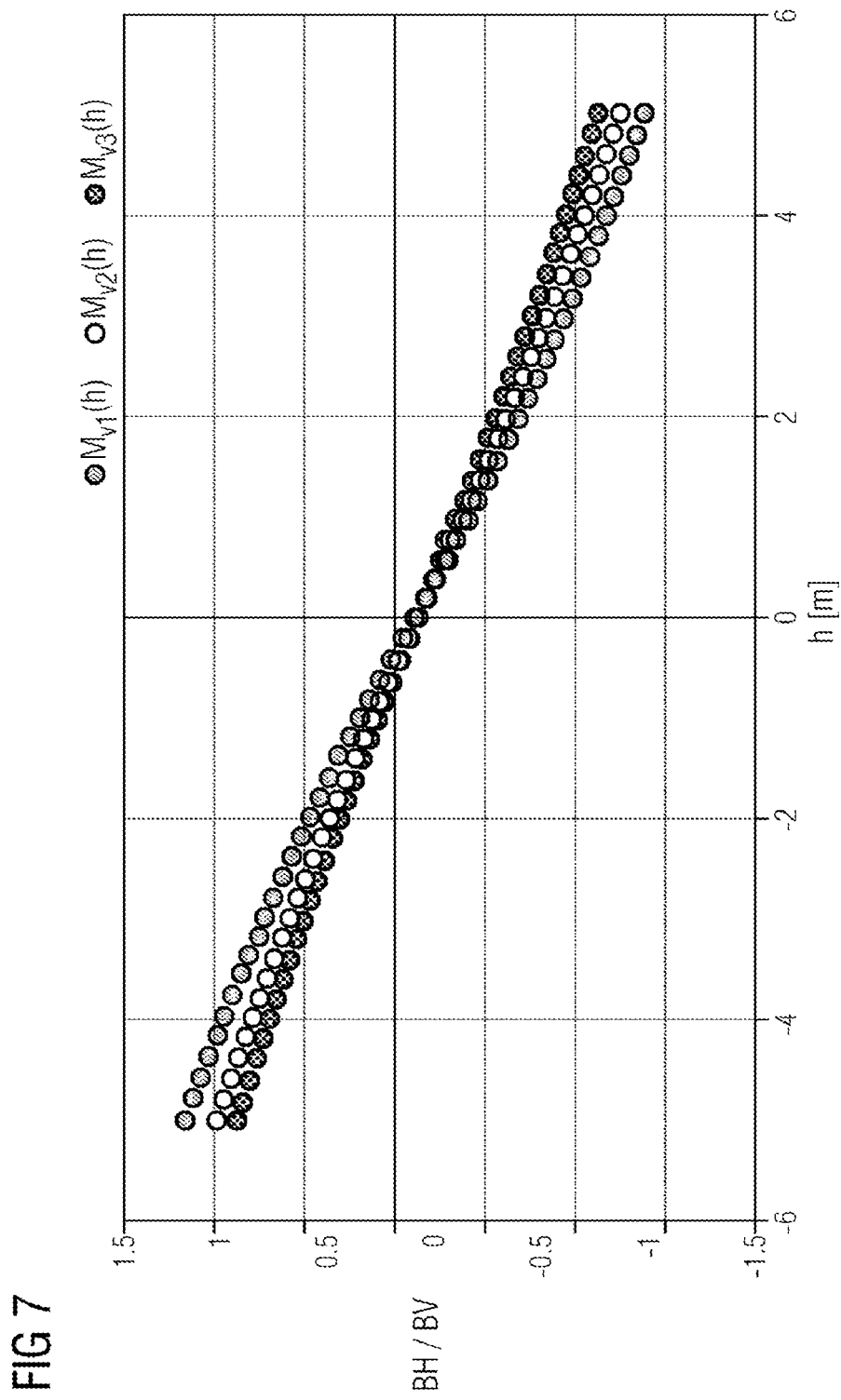
FIG. 7 shows a profile of the ratio of vertical component to horizontal component of the magnetic flux density against the horizontal position of the measuring system with the assumption of a perturbation due to a second parallel conductor at a large distance.
Figure 8:
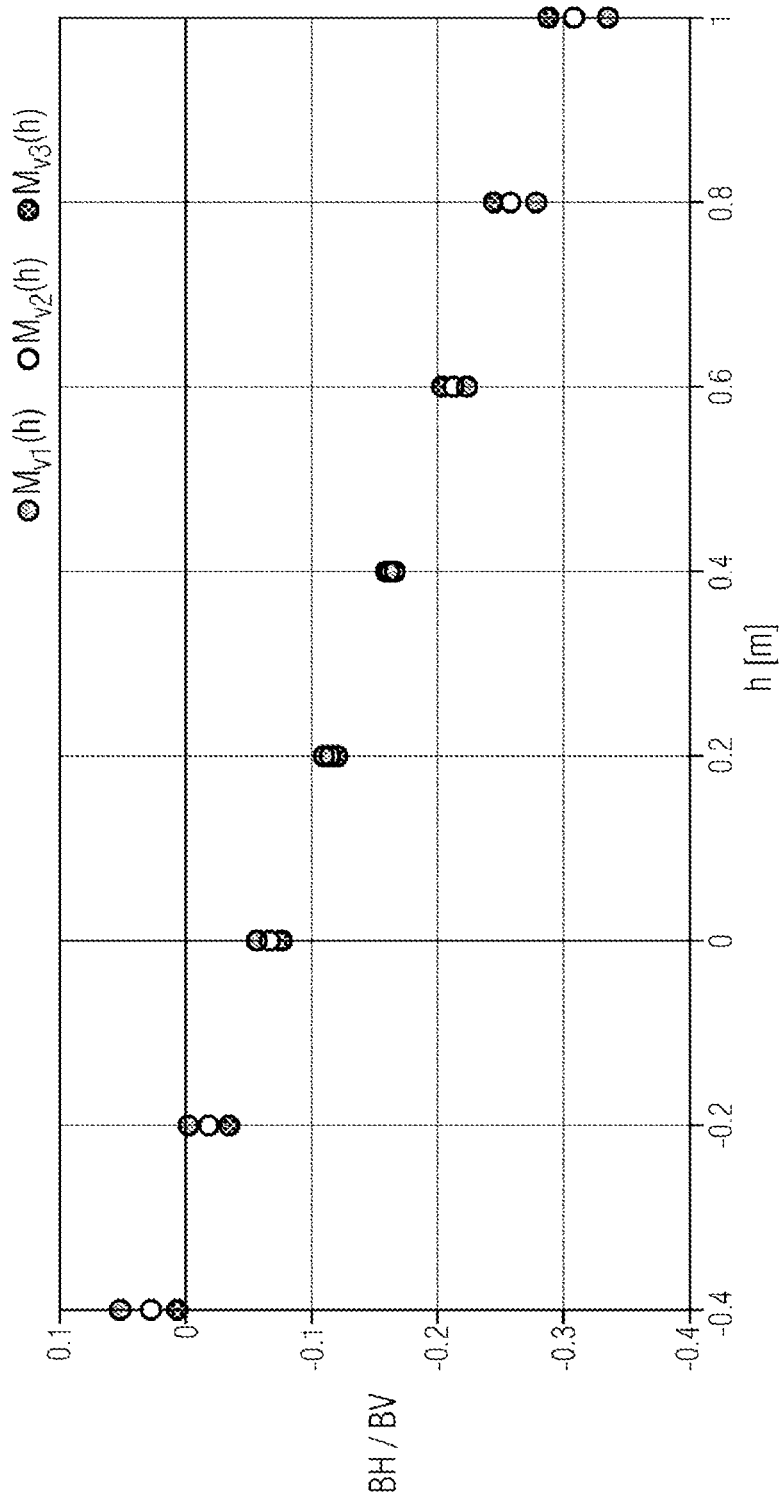
FIG. 8 shows a profile as in FIG. 7 with a finer resolution.

If a second or third coil system of the same type is carried simultaneously, for example by the UAV—but with a different defined vertical position v above the pipeline/conductor—then the influence of external perturbations on the position determination of the pipeline may be minimized as follows:

There are now for example three ratios $M_{v1}(h)$, $M_{v2}(h)$, $M_{v3}(h)$ of the vertical and horizontal components (see FIGS. 7 and 8). These are considered against the horizontal position h of the measuring apparatus. In the event of external perturbations, the profile of the ratio M (FIG. 5, unperturbed) changes. At the point of intersection $h_s$ (Equation (5)) of the ratios $M_{v1}(h)$, $M_{v2}(h)$, $M_{v3}(h)$—this should again be in the vicinity of the zero crossing—the derivatives with respect to the horizontal position h are again formed.

$$M_{V1}(h_s)=M_{V2}(h_s)=M_{V3}(h_s) \quad (5)$$

This may be done by calculating a local best-fit line (fitting line or Moore-Penrose inverse). For each measuring system 2, there is then a different value since each measuring system 2 has a different vertical position v.

$$\left(\frac{\partial M_{V1}}{\partial h}\right)^{-1}_{h_s \text{ with } M_{V1}(h_s)=M_{V2}(h_s)=M_{V3}(h_s)} = v1_{Pipeline} \quad (6)$$

$$\left(\frac{\partial M_{V2}}{\partial h}\right)^{-1}_{h_s \text{ with } M_{V1}(h_s)=M_{V2}(h_s)=M_{V3}(h_s)} = v2_{Pipeline} \quad (7)$$

$$\left(\frac{\partial M_{V3}}{\partial h}\right)^{-1}_{h_s \text{ with } M_{V1}(h_s)=M_{V2}(h_s)=M_{V3}(h_s)} = v3_{Pipeline} \quad (8)$$

The associated best-fit lines have the form:

$$M_{V1}(h) = \frac{h}{v1} + m_{0v1} \quad (9)$$

$$M_{V2}(h) = \frac{h}{v2} + m_{0v2} \quad (10)$$

$$M_{V3}(h) = \frac{h}{v1} + m_{0v3} \quad (11)$$

The horizontal position h of the pipeline may be determined as follows from the calculated values.

$$h_{Pipeline}=\tfrac{1}{6}(v_1 \cdot M_{0\ v1}+v_2 \cdot m_{0\ v2}+v_3\ m_{0\ v3})+\tfrac{1}{2}h_s \quad (12)$$

Figure 9:
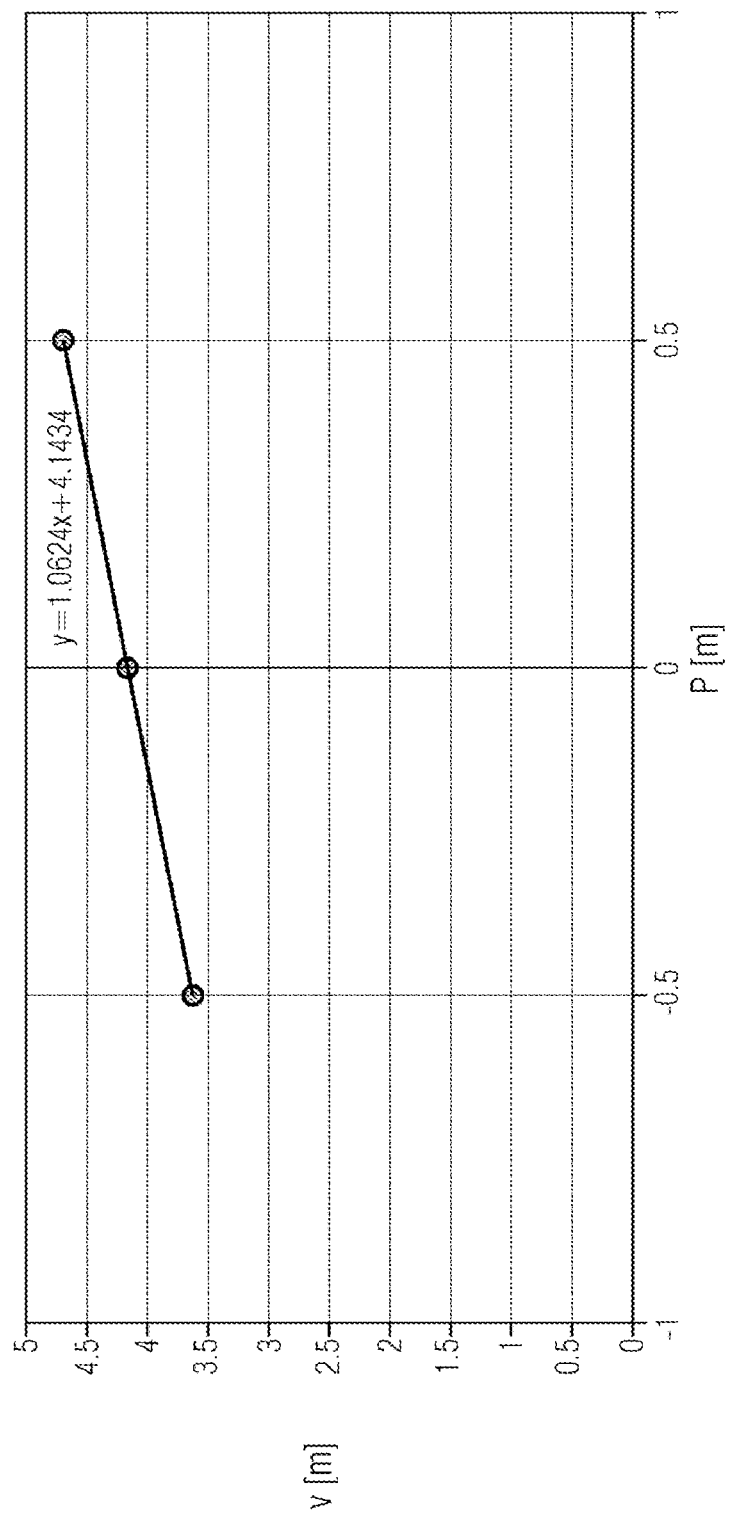
FIG. 9 shows a profile of the distance of the measuring apparatus from the conductor as a function of the position of the individual measuring systems (with the assumption of a perturbation due to a parallel second conductor at a large distance)

Since the relative distance of the measuring systems 2 from one another is known (for example −1 m, 0 m and 1 m), the distances of the pipeline/conductor from the individual measuring systems 2 that have been determined may be plotted against their position in the measuring apparatus, as represented in FIG. 9.

FIG. 9 shows a profile of the depth T of the conductor (relative distances v1, v2 and v3) according to the position P in meters m of the individual measuring systems 2 of the measuring apparatus (with the assumption of a perturbation due to a parallel second conductor at a large distance). In the procedure described here using a plurality of measuring systems (coil system), T corresponds to the vertical distance between the central measuring apparatus and the midpoint of the conductor/pipeline. It is therefore the vertical position v of the measuring apparatus in the middle of the measuring apparatuses (in the case of a plurality of measuring systems).

A best-fit line of the type:

$$y=a \cdot x+b \quad (13)$$

is then formed.

Placed through the three relative distances v1, v2 and v3 that have been determined. The depth T of the conductor/pipeline in the relative coordinate system of the measuring apparatus may then be calculated as follows:

$$T = \frac{b}{2} \cdot \left(1 + \frac{1}{a}\right) \quad (14)$$

or alternatively:

$$T = \frac{b}{3} \cdot \left(2 + \frac{1}{a}\right) \quad (15)$$

Figure 10:
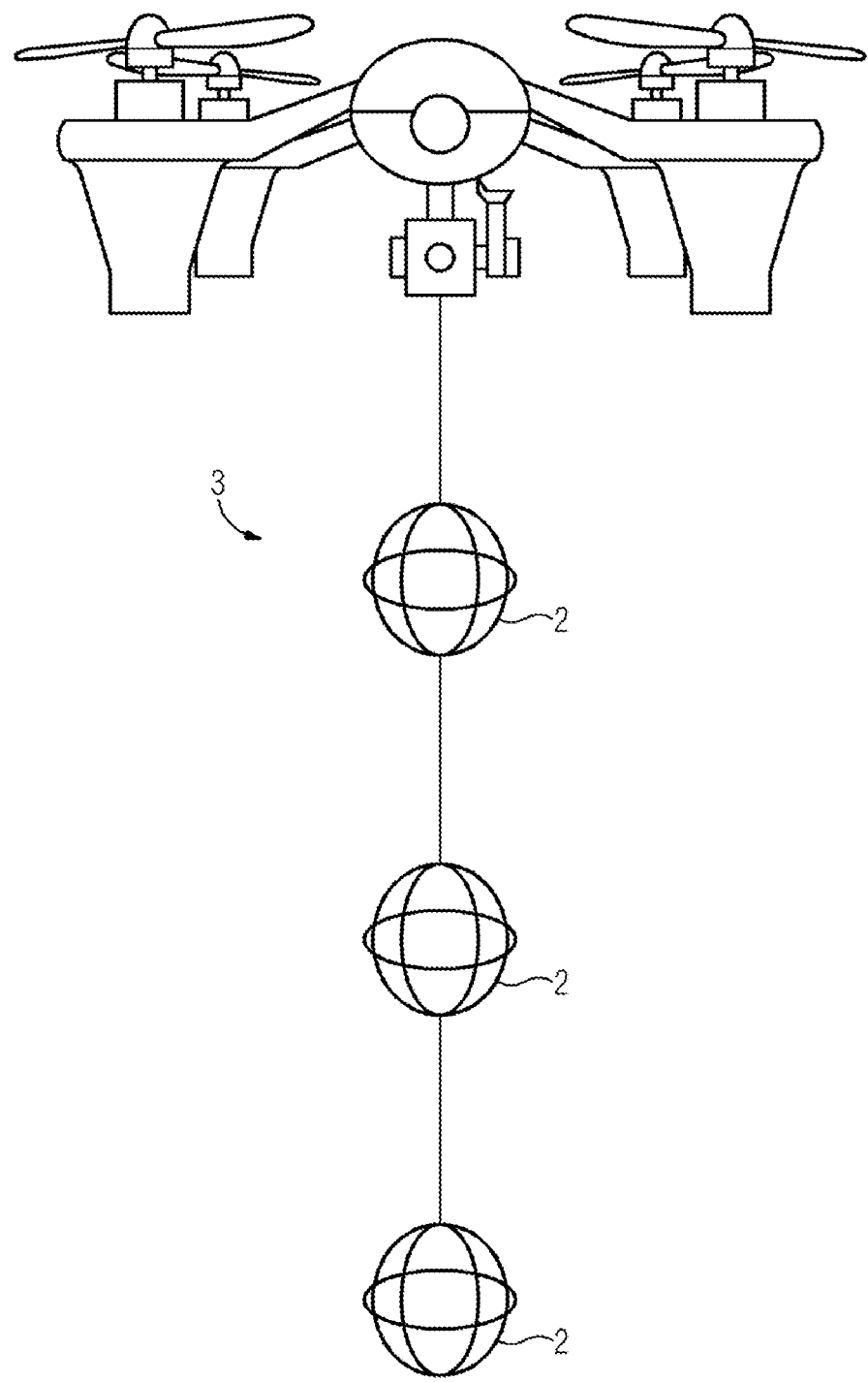
FIG. 10 shows a schematic representation of the measuring device consisting of three coil systems (measuring systems).

A schematic representation of the measuring device 3 consisting of three measuring systems 2 (coil systems), for example, is represented in FIG. 10.

Although the invention has been illustrated and described in greater detail by way of the exemplary embodiments, the invention is not restricted by the examples disclosed, and other variants may be derived therefrom by the person skilled in the art without departing from the protective scope of the invention.

LIST OF REFERENCES 1 conductor
2 measuring system
3 measuring device
$B_H$ horizontal component of the magnetic flux density
$B_V$ By vertical component of the magnetic flux density
B[T] magnetic flux density in tesla
h horizontal position relative to the conductor
$h_s$ point of intersection
h[m] horizontal position in meters
h* h coordinate axis
I current strength
M ratio of $B_V$ to $B_H$
$M_{vi}(h)$ ratio of $B_V$ to $B_H$ in the case of a plurality of measuring systems with i=[1; ∞[
Si method step Si with i=[1; 6]
T depth of the conductor/average vertical position v
P[m] position of the measuring system in the measuring apparatus in meters
v vertical position relative to the conductor
vi relative distances with i=[1; ∞[
v* v coordinate axis
z* z coordinate axis

The invention claimed is:

1. A method for determining the average distance (v) of a measuring device from a conductor, wherein the measuring device comprises a measuring system, wherein an electrical current flows through the conductor so that a magnetic field having a magnetic flux density (B[T]) is formed, the magnetic flux density (B[T]) having a horizontal component (BH) and a vertical component (BV), the method comprising:
   determining (S1) a profile of the horizontal component (BH) against the horizontal position (h[m]) of the measuring device, wherein the horizontal position (h[m]) indicates the orthogonal distance of the measuring device from the longitudinal axis of the conductor parallel to the Earth's surface, wherein the profile of the horizontal component (BH) is determined by measuring the horizontal components (BH) at at least two different horizontal positions (h[m]) using the measuring system of the measuring device, which changes the horizontal position (h[m]), and
   determining (S2) a profile, associated with the profile that has been determined of the horizontal component (BH), of the vertical component (BV) against the horizontal position (h[m]) of the measuring device, wherein the profile of the vertical component (BV) is determined by measuring the vertical components (BV), associated with the horizontal components (BH) that have been determined, using the measuring system, determining (S3) the ratio (M) of the profile of the vertical component (BV) to the profile of the horizontal component (BH) as a function of the horizontal position (h[m]) of the measuring device, determining (S4) the derivative of the ratio (M) with respect to the horizontal position, determining (S5) the inverse of the derivative, and determining (S6) the average distance (v) of the measuring devices from the conductor from the inverse of the derivative.

2. The method as claimed in claim 1, wherein each measuring system comprises three coils, the coils being mutually orthogonal.

3. The method as claimed in claim 2, wherein the induction voltage generated in the coils by the magnetic field is filtered.

4. The method as claimed in claim 3, wherein a bandpass filter is used for the filtering, the bandpass filter being adapted according to the frequency of the current of the current-carrying conductor.

5. The method as claimed in claim 1, wherein the conductor is part of a pipeline for transporting oil and/or gas.

6. The method as claimed in claim 1, wherein the conductor is part of a cathodic corrosion protection system of a pipeline.

7. The method as claimed in claim 1, wherein the electrical current which flows through the conductor has a frequency range of from 30 Hz to 2 kHz.

8. The method as claimed in claim 1, wherein the electrical current which flows through the conductor has a sinusoidal characteristic.

9. The method as claimed in claim 1, wherein the measuring device is transported by a manned or unmanned flying object.

10. A measuring device for determining the average distance between the measuring device and a conductor through which a current flows, the measuring device being arranged in or on an aircraft, comprising:
at least two measuring systems arranged vertically with respect to one another, each measuring system comprising three coils, the coils being mutually orthogonal,
wherein the measuring device is configured and programmed to carry out the method as claimed in claim 1.

11. A method for determining the average distance (v) of at least two mutually separated measuring devices from a conductor, wherein each measuring device comprises a measuring system, wherein an electrical current flows through the conductor so that a magnetic field having a magnetic flux density (B[T]) is formed, the magnetic flux density (B[T]) having a horizontal component (BH) and a vertical component (BV), the method comprising:
determining (S1) a profile of the horizontal component (BH) against the horizontal position (h[m]) of the measuring devices, wherein the horizontal position (h[m]) indicates the orthogonal distance of the measuring device from the longitudinal axis of the conductor parallel to the Earth's surface, wherein the profile of the horizontal component (BH) is determined by measuring the horizontal components (BH) using the measuring systems of the measuring devices,
determining (S2) the profile, associated with the profile that has been determined of the horizontal component (BH), of the vertical component (BV) against the horizontal position (h[m]) of the measuring devices,
wherein the profile of the vertical component (BV) is determined by measuring the vertical components (BV), associated with the horizontal components (BH) that have been determined, using the corresponding measuring systems,
determining (S3) the ratio (M) of the profile of the vertical component (BV) to the profile of the horizontal component (BH) as a function of the horizontal position (h[m]) of the measuring devices,
determining (S4) the derivative of the ratio (M) with respect to the horizontal position (h[m]),
determining (S5) the inverse of the derivative, and
determining (S6) the average distance (v) of the measuring devices from the conductor from the inverse of the derivative.

12. A measuring device for determining the average distance of at least two mutually separated measuring devices from a conductor through which a current flows, the measuring device being arranged in or on an aircraft, comprising:
at least two measuring systems arranged vertically with respect to one another;
wherein the measuring device is configured and programmed to carry out the method as claimed in claim 11.

13. A method for determining the average distance (v) of a measuring device from a conductor, wherein the measuring device comprises at least two measuring systems, the measuring systems being arranged at different vertical positions (P[m]), wherein an electrical current flows through the conductor so that a magnetic field having a magnetic flux density (B[T]) is formed, the magnetic flux density (B[T]) having a horizontal component (BH) and a vertical component (BV), the method comprising:
determining (S1) profiles of the horizontal component (BH) against the horizontal position (h[m]) of the measuring systems, wherein the horizontal position (h[m]) indicates the orthogonal distance of the measuring device from the longitudinal axis of the conductor parallel to the Earth's surface, wherein the profiles of the horizontal component (BH) are determined by measuring the horizontal components (BH) at at least two different horizontal positions (h[m]) using the measuring systems of the measuring device, which changes the horizontal position (h[m]), and
determining (S2) the profiles, associated with the profiles that have been determined of the horizontal component (BH), of the vertical components (BV) against the horizontal position (h[m]) of the measuring device,
wherein the profiles of the vertical components (BV) are determined by measuring the vertical components (BV), associated with the horizontal components (BH) that have been determined, using the corresponding measuring systems,
determining (S3) the ratios (M) of the profiles of the vertical component (BV) to the profiles of the horizontal component as a function of the horizontal position (BH) of the measuring device,
determining (S4) the derivatives of the ratios (M) with respect to the horizontal position (h[m]),
determining (S5) the inverses of the derivatives, and
determining (S6) the average distance (T) of the measuring devices from the conductor from the inverses of the derivatives.

14. The method as claimed in claim 13, wherein best-fit lines to take into account the different vertical positions (P[m]) of the measuring systems are compiled and included for determining the average distance (v) of the measuring devices from the conductor from the inverses of the derivatives.

15. A measuring device for determining the average distance between the measuring device and a conductor through which a current flows, the measuring device being arranged in or on an aircraft, comprising:
at least two measuring systems, the measuring systems being arranged at different vertical positions (P[m]);
wherein the measuring device is configured and programmed to carry out the method as claimed in claim 13.

16. A method for determining the average distance (v) of at least two mutually separated measuring devices from a conductor, wherein each measuring device comprises an equal number of at least two measuring systems, the measuring systems of the same measuring device being arranged at different vertical positions (P[m]), wherein an electrical current flows through the conductor so that a magnetic field having a magnetic flux density (B[T]) is formed, the magnetic flux density having a horizontal component (BH) and a vertical component (BV), the method comprising:
determining (S1) profiles of the horizontal component (BH) against the horizontal positions (h[m]) using measuring systems that correspond in respect of the vertical position (P[m]), wherein the horizontal position (h[m]) indicates the orthogonal distance of the measuring device from the longitudinal axis of the conductor parallel to the Earth's surface, wherein the profiles of the horizontal component (BH) are determined by measuring the horizontal components (BH) using the measuring systems of the measuring devices, and determining (S2) the profiles, associated with the profiles that have been determined of the horizontal component (BH), of the vertical components (BV) against the horizontal position (h[m]) of the measuring devices, wherein the profiles of the vertical components (BV) are determined by measuring the vertical components (BV), associated with the horizontal components (BH) that have been determined, using the corresponding measuring systems,
determining (S3) the ratios (M) of the profiles of the vertical component (BV) to the profiles of the horizontal component (BH) as a function of the horizontal position (h[m]) of the measuring device,
determining (S4) the derivatives of the ratios (M) with respect to the horizontal positions (h[m]),
determining (S5) the inverses of the derivatives, and
determining (S6) the average distance (T) of the measuring devices from the conductor from the inverses of the derivatives.

17. A measuring device for determining the average distance between at least two mutually separated measuring devices from a conductor through which a current flows, the measuring device being arranged in or on an aircraft, comprising:
an equal number of at least two measuring systems, the measuring systems of the same measuring device being arranged at different vertical positions (P[m]);
wherein the measuring device is configured and programmed to carry out the method as claimed in claim 16.

* * * * *